(12) United States Patent
Yuk et al.

(10) Patent No.: US 8,644,869 B2
(45) Date of Patent: Feb. 4, 2014

(54) METHOD AND APPARATUS FOR COMMUNICATION USING MULTIPLE CARRIERS

(75) Inventors: Young Soo Yuk, Anyang-si (KR); Ki Seon Ryu, Anyang-si (KR); In Uk Jung, Anyang-si (KR); Eun Jong Lee, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 438 days.

(21) Appl. No.: 13/062,503

(22) PCT Filed: Sep. 2, 2009

(86) PCT No.: PCT/KR2009/004932
§ 371 (c)(1),
(2), (4) Date: Mar. 4, 2011

(87) PCT Pub. No.: WO2010/027186
PCT Pub. Date: Mar. 11, 2010

(65) Prior Publication Data
US 2011/0159903 A1 Jun. 30, 2011

Related U.S. Application Data

(60) Provisional application No. 61/094,568, filed on Sep. 5, 2008, provisional application No. 61/141,214, filed on Dec. 29, 2008, provisional application No. 61/145,000, filed on Jan. 15, 2009.

(30) Foreign Application Priority Data

Jul. 24, 2009 (KR) .................. 10-2009-0067754

(51) Int. Cl.
*H04B 7/00* (2006.01)
*H04W 72/00* (2009.01)
*H04W 74/00* (2009.01)

(52) U.S. Cl.
USPC ........ 455/509; 455/500; 455/450; 455/452.1; 455/455

(58) Field of Classification Search
USPC .................... 455/450, 452.2, 452.1, 453, 509
See application file for complete search history.

(56) References Cited

U.S. PATENT DOCUMENTS

| | | | |
|---|---|---|---|
| 7,352,767 B2 * | 4/2008 | Jang .............................. | 370/431 |
| 8,134,998 B2 * | 3/2012 | Miyoshi et al. ................ | 370/350 |
| 8,320,314 B2 * | 11/2012 | Jung et al. ..................... | 370/329 |
| 8,553,655 B1 * | 10/2013 | Dinan ........................... | 370/336 |
| 8,559,405 B2 * | 10/2013 | Dinan ........................... | 370/336 |
| 2009/0046701 A1 * | 2/2009 | Nishio et al. .................. | 370/350 |
| 2011/0211571 A1 * | 9/2011 | Ryu et al. ...................... | 370/350 |

\* cited by examiner

FOREIGN PATENT DOCUMENTS

| | | |
|---|---|---|
| KR | 10-2005-0071845 A | 7/2005 |
| KR | 10-2006-0109799 A | 10/2006 |
| KR | 10-2007-0080144 A | 8/2007 |
| WO | 2007-108077 A1 | 9/2007 |

*Primary Examiner* — Tilahun B Gesesse
(74) *Attorney, Agent, or Firm* — Lee, Hong, Degerman, Kang & Waimey

(57) ABSTRACT

A method and apparatus for communication using multiple carriers is provided. A mobile station receives information regarding at least one assigned carrier selected from the available carriers based on the multiple carrier capability from a base station. The mobile station activates or inactivates the at least one assigned carrier by receiving a message comprising information indicating activation or inactivation of the at least one assigned carrier from the base station. Signaling overhead for managing multiple carriers may be reduced.

17 Claims, 4 Drawing Sheets

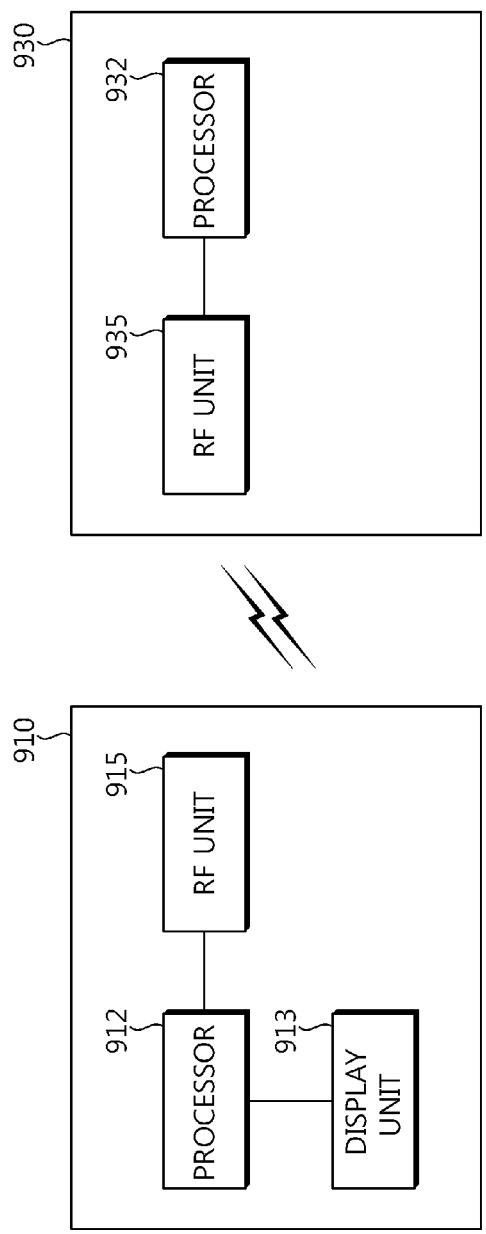

METHOD AND APPARATUS FOR COMMUNICATION USING MULTIPLE CARRIERS

This application is the National Stage filing under 35 U.S.C. 371 of International Application No. PCT/KR2009/004932, filed on Sep. 2, 2009, which claims the benefit of earlier filing date and right of priority to Korean Application No. 10-2009-0067754, filed on Jul. 24, 2009, and also claims the benefit of U.S. Provisional Application Ser. Nos. 61/145,000, filed on Jan. 15, 2009, 61/141,214, filed on Dec. 29, 2008, and 61/094,568, filed on Sep, 5, 2008, the contents of all of which are incorporated by reference herein in their entireties.

TECHNICAL FIELD

The present invention relates to wireless communications, and more particularly, to a method and apparatus for communication using multiple carriers in a wireless communication system.

BACKGROUND ART

3rd generation partnership project (3GPP) long term evolution (LTE) and institute of electrical and electronics engineers (IEEE) 802.16m have been developed as candidates of a next generation wireless communication system. The 802.16m standard has two aspects. One aspect is that the 802.16m is an amendment of the existing 802.16e standard in terms of continuity from the past. The other aspect is that the 802.16m is a standard for an international mobile telecommunication (IMT)-advanced system of a next generation in terms of continuity to the future. Therefore, the 802.16m standard needs to satisfy all requirements for the IMT-advanced system while maintaining backward compatibility with a mobile WiMAX system conforming to the 802.16e standard.

In general, a wireless communication system uses one bandwidth for data transmission. For example, a 2nd generation wireless communication system uses a bandwidth of 200 kHz~1.25 MHz, and a 3rd generation wireless communication system uses a bandwidth of 5 MHz~10 MHz. To support growing transmission capacity, the 3GPP LTE or the 802.16m has recently expanded its bandwidth to 20 MHz or higher. It may be necessary to increase the bandwidth to obtain high transmission capacity. However, if a large bandwidth is supported even when a service request level is low, it may cause significant power consumption.

Therefore, a multiple carrier system capable of transmitting and/or receiving broadband data by using a plurality of carriers has been introduced by defining a carrier having one bandwidth and a center frequency. By using one or more carriers, a narrowband and a broadband are both supported. For example, if one carrier corresponds to a bandwidth of 5 MHz, four carriers are used to support a bandwidth of up to 20 MHz.

If the multiple carrier system always uses all carriers, power may be excessively consumed in a mobile station. For example, if all carriers are always used by a mobile station having a service request level which is low enough to provide a service by using only one carrier, resource efficiency is decreased and a radio frequency (RF) front-end has an unnecessarily great load.

There is a need for a method capable of effectively operating multiple carriers according to a service request level.

DISCLOSURE OF INVENTION

Technical Problem

The present invention provides a method and apparatus for communication in which multiple carriers are operated using multi-level management.

The present invention also provides a method and apparatus for communication using multiple carriers to reduce power consumption.

Solution to Problem

In an aspect, a method for communication using multiple carriers in a wireless communication system is provided. The method performed by a mobile station includes receiving multiple carrier information regarding available carriers from a base station, transmitting multiple carrier capability to the base station, receiving information regarding at least one assigned carrier selected from the available carriers based on the multiple carrier capability from the base station, activating or inactivating the at least one assigned carrier by receiving a message comprising information indicating activation or inactivation of the at least one assigned carrier from the base station, and if the at least one assigned carrier is activated, transmitting or receiving data by using the activated carrier.

The multiple carrier information may be received via a primary carrier which is always activated. The activation or inactivation of the at least one assigned carrier may be received via the primary carrier.

The available carriers may be referenced by a physical index unique in the base station, and the activation or inactivation of the at least one assigned carrier may be referenced by a logical index unique in the mobile station. A logical index of a primary carrier may be fixed.

The multiple carrier information may be broadcast by the base station.

The activation or inactivation of the at least one assigned carrier may be determined based on a quality of service (QoS) requirement or a load condition of the base station.

In another aspect, a method for communication using multiple carriers in a wireless communication system is provided. The method performed by a base station includes broadcasting multiple carrier information regarding available carriers, transmitting information regarding at least one assigned carrier selected from the available carriers to a mobile station, determining whether to activate or inactivate the at least one carrier selected from the assigned carriers, and transmitting information regarding on activation or inactivation of the at least one assigned carrier to the mobile station.

In still another aspect, a mobile station includes a radio frequency (RF) unit for transmitting and receiving a radio signal, and a processor coupled to the RF unit and configured to receive multiple carrier information regarding available carriers from a base station, transmit multiple carrier capability to the base station, receive information regarding at least one assigned carrier selected from the available carriers based on the multiple carrier capability from the base station, activate or inactivate the at least one assigned carrier by receiving a message comprising information indicating activation or inactivation of the at least one assigned carrier from the base station, and if the at least one assigned carrier is activated, transmit or receiving data by using the activated carrier.

Advantageous Effects of Invention

Signaling overhead for managing multiple carriers may be reduced. Power consumption of a mobile station can be reduced by performing multi-level management on multiple carriers.

BRIEF DESCRIPTION OF DRAWINGS

FIG. 5 is a block diagram of a wireless communication system according to an embodiment of the present invention.

MODE FOR THE INVENTION

Figure 1:
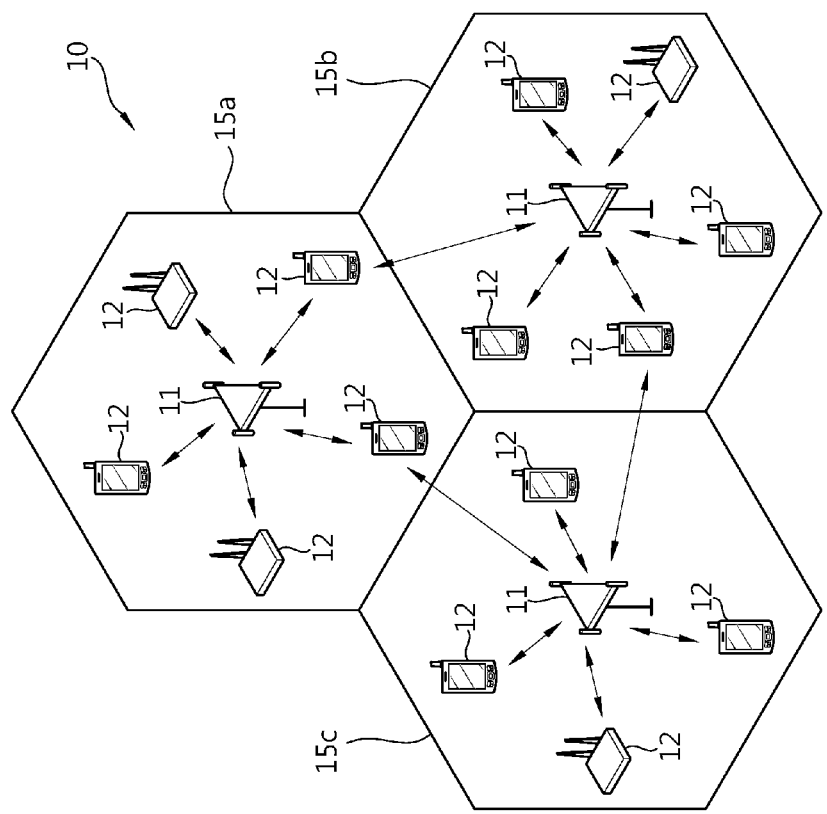
FIG. 1 shows a wireless communication system.

FIG. 1 shows a wireless communication system. A wireless communication system 10 includes at least one base station (BS) 11. Each BS 11 provides communication services to specific geographical regions (generally referred to as cells) 15a, 15b, and 15c. Each cell can be divided into a plurality of regions (referred to as sectors). A mobile station (MS) 12 may be fixed or mobile, and may be referred to as another terminology, such as an user equipment (UE), a user terminal (UT), a subscriber station (SS), a wireless device, a personal digital assistant (PDA), a wireless modem, a handheld device, etc. The BS 11 is generally a fixed station that communicates with the MS 12 and may be referred to as another terminology, such as an evolved node-B (eNB), a base transceiver system (BTS), an access point, etc. Hereinafter, downlink denotes communication link from the BS to the MS, and uplink denotes communication link from the MS to the BS. In the downlink, a transmitter may be a part of the BS, and a receiver may be a part of the MS. In the uplink, the transmitter may be a part of the MS, and the receiver may be a part of the BS.

Spectrum aggregation (also referred to as bandwidth aggregation or carrier aggregation) is for supporting a plurality of carriers. The spectrum aggregation is introduced to support an increasing throughput, to prevent cost rising caused by introduction of a broadband radio frequency (RF) device, and to ensure compatibility with a legacy system. For example, when five carriers are assigned with a granularity of a carrier unit having a bandwidth of 5 MHz, up to 20 MHz can be supported.

The spectrum aggregation can be classified into contiguous spectrum aggregation achieved between consecutive carriers in a frequency domain and non-contiguous spectrum aggregation achieved between discontinuous carriers. The number of carriers aggregated in a downlink may be different from the number of carriers aggregated in an uplink. Symmetric aggregation is achieved when the number of downlink carriers is equal to the number of uplink carriers. Asymmetric aggregation is achieved when the number of downlink carriers is different from the number of uplink carriers.

Multiple carriers may have different sizes (i.e., bandwidths). For example, when five carriers are used to configure a band of 70 MHz, the band can be configured as 5 MHz carrier (carrier #0)+20 MHz carrier (carrier #1)+20 MHz carrier (carrier #2)+20 MHz carrier (carrier #3)+5 MHz carrier (carrier #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

Carriers can be classified into fully configured carriers and partially configured carriers according to directivity of the carriers. The fully configured carriers are bidirectional carriers that can transmit and/or receive all control signals and data. The partially configured carriers are unidirectional carriers that can transmit only downlink data. The partially configured carriers may be mainly used in a multicast and broadcast service (MBS).

Carriers can be classified into a primary carrier and a secondary carrier. The primary carrier is a carrier that is always activated. The secondary carrier is a carrier that is activated or inactivated according to a specific condition. Activation implies that traffic data can be transmitted or received, or is in a ready state. Inactivation implies that traffic data cannot be transmitted or received, and measurement or minimum information transmission/reception can be performed. An MS may use only one primary carrier, or may use one or more secondary carriers together with the primary carrier. The primary carrier and/or the second carrier can be assigned by a BS to the MS. The primary carrier may be a fully configured carrier. Major control information such as system information, network configuration, synchronization, etc. may be exchanged between the BS and the MS via the primary carrier. The secondary carrier may be a fully configured carrier or a partially configured carrier. The secondary carrier may be assigned at the request of the MS or under the instruction of the BS. The primary carrier may be used for network entry of the MS and/or assignment of the secondary carrier. Rather than being fixed to a specific carrier, the primary carrier may be selected from the fully configured carriers. A carrier configured as the second carrier may change to the primary carrier.

Figure 2:
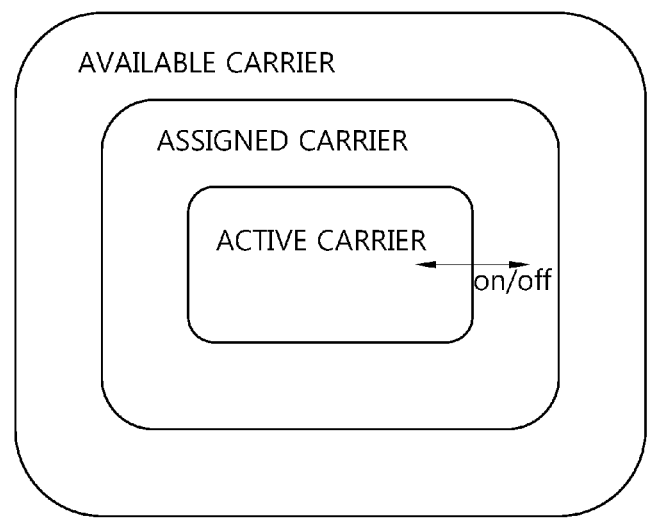
FIG. 2 shows a model of managing multiple carriers according to an embodiment of the present invention.

FIG. 2 shows a model of managing multiple carriers according to an embodiment of the present invention. A model of multi-level management is proposed to effectively manage multiple carriers and to decrease a signaling overhead. The carriers are classified into three categories.

Available carrier: all carriers which are available in a BS

Assigned carrier: a carrier assigned by a BS to an MS according to capacity of the MS to be used.

Active carrier: a carrier used when an MS receives and/or transmits a control signal/data Each carrier is characterized as shown in the following table.

TABLE 1

| Name | Definition | Features |
|---|---|---|
| Available carrier | Multiple carriers which are available in a BS | These carriers are carriers currently available in a BS, and indicate capability of the BS. Information on these carriers can be broadcast. Each available carrier is referenced by a physical index unique in the BS. |
| Assigned carrier | The subset of available carriers which may be potentially used by an MS | These carriers are determined by a BS according to capability of an MS and a load condition of the BS. These carriers are assigned based on multiple carrier capability negotiation between the MS and the BS. The MS does not have to perform any operation until these carriers are activated. However, measurement, system information update, ranging, etc., can be performed at the request of the BS. Each assigned |

TABLE 1-continued

| Name | Definition | Features |
| --- | --- | --- |
| | | carrier can be referenced by a logical index unique in the MS. |
| Active carrier | The carriers which are in ready state to be used for data transmission | To ensure quality of service (QoS) of an MS, these carriers are activated by being selected from assigned carriers. A feedback signal such as a channel quality indicator (CQI), a rank indicator (RI), a precoding matrix indicator (PMI), etc., can be transmitted for link scheduling. The MS can receive radio resource information by using active carriers to transmit uplink/downlink data. The MS can receive a broadcast channel (BCH) or a super frame header (SFH) by using active carriers to obtain system information. The MS can perform initial ranging by using active carriers to synchronize an uplink channel. |

The BS can periodically or aperiodically transmit multiple carrier information regarding available carriers through a broadcast channel. The multiple carrier information may be transmitted using a neighbor advertisement message that is used when the BS provides the MS with information regarding neighbor cells for cell search and for handover of the MS.

The MS may obtain the multiple carrier information before or at the time of initial network entry. Alternatively, the MS may obtain the multiple carrier information after the initial network entry is completed.

After obtaining the multiple carrier information, the MS exchange multiple carrier capability in the process of capability negotiation with the BS. The BS may assign the assigned carriers to the MS on the basis of the multiple carrier capability of the MS. A carrier used in network entry may be used as a primary carrier. Alternatively, the BS may designate another carrier as the primary carrier.

The assigned carriers are not directly used. When the assigned carriers are activated, the carriers are used as a primary carrier or a secondary carrier. The primary carrier is always an active carrier. The secondary carrier is activated or inactivated under the instruction of the BS. When the assigned secondary carriers are activated, the carriers are the active secondary carriers. The BS may determine activation or inactivation on the basis of a QoS requirement, a load condition, etc. For inactive carriers, operations such as link measurement, synchronization signal tracking, etc. may be suspended to reduce power consumption.

The assigned carriers are assigned according to capability negotiation between the BS and the MS. Issues to be considered and capability exchanged between the BS and the MS may include the followings: (1) multiple carrier capability of the MS; (2) a maximum bandwidth of an RF front-end; (3) a supportable frequency band; (4) the number of concurrently receivable bandwidths; (5) capability of the BS; (6) a load condition of the BS; and (7) an assignment policy of the BS.

The BS instructs the MS to activate one or more carriers selected from the assigned carriers. Activation information is related to QoS, and thus may be included in a message for service flow control together with a QoS parameter. For example, the activation information may be included in at least any one of messages (i.e., dynamic service addition (DSA)-request (REQ), DSA-response (RSP), dynamic service deletion (DSD)-REQ, DSD-RSP, dynamic service change (DSC)-REQ, and DSC-RSP) defined in the institute of electrical and electronics engineers (IEEE) 802.16m standard. To satisfy the QoS requirement, the active carriers may be in a ready state capable of transmitting/receiving data.

Figure 3:
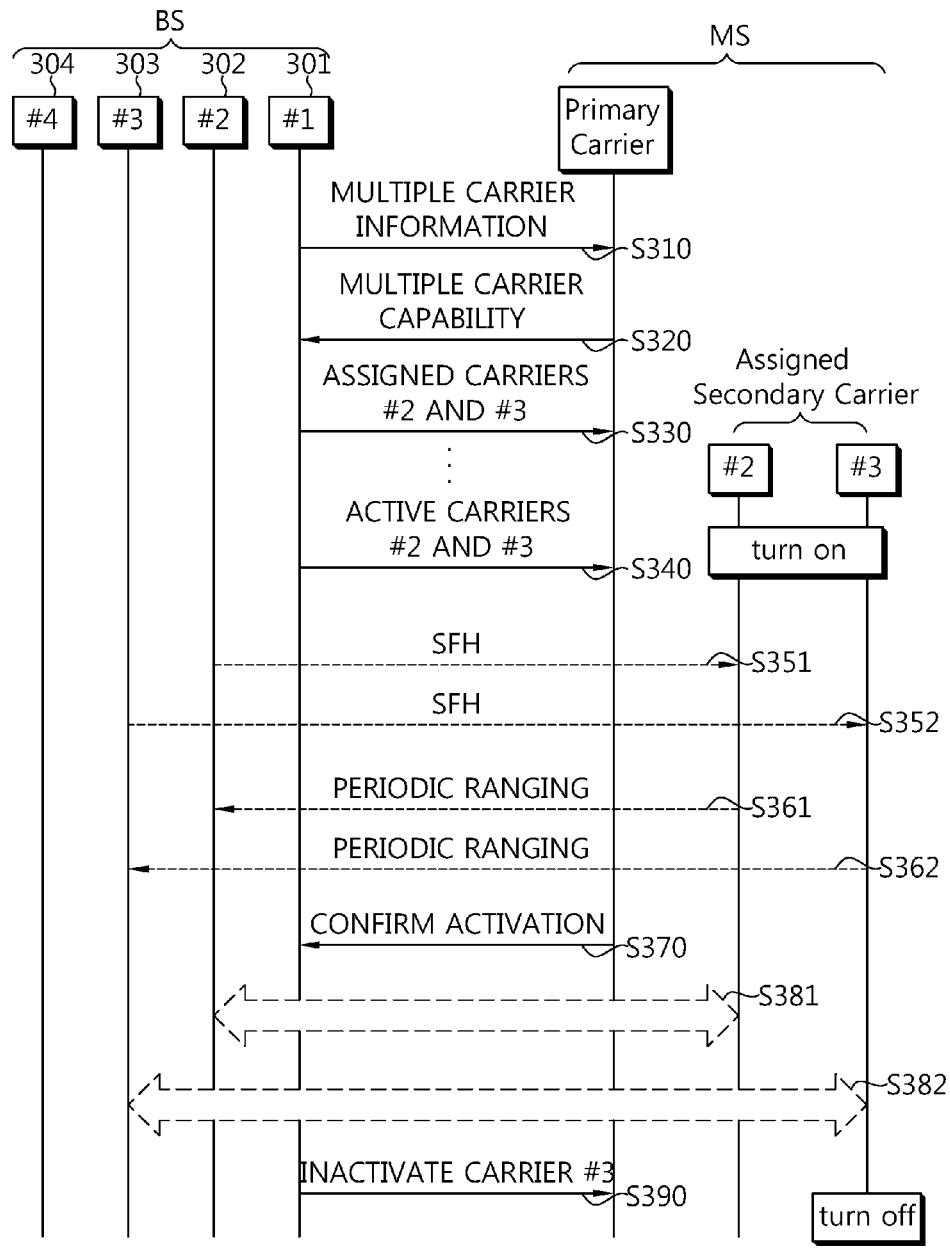
FIG. 3 is a flowchart showing communication using multiple carriers according to an embodiment of the present invention.

FIG. 3 is a flowchart showing communication using multiple carriers according to an embodiment of the present invention. First, an MS attempts to perform a network entry process by using a fully configured carrier. The MS detects a preamble on the fully configured carrier to obtain downlink synchronization, and thereafter receives system information. The fully configured carrier on which the system information is received is used as a primary carrier. The primary carrier may change afterwards under the instruction of a BS.

In step S310, the BS transmits multiple carrier information to the MS as a part of the system information or via a medium access control (MAC) management message. The multiple carrier information includes information regarding carriers which are available in the BS. The multiple carrier information may include at least any one of a physical index for each available carrier, a center frequency, a channel bandwidth, a carrier type (i.e., full configuration/partial configuration), and a preamble index. It is assumed herein that four carriers #1, #2, #3, and #4 are available carriers.

In step S320, the MS transmits multiple carrier capability to the BS. The multiple carrier capability may include, for example, a supportable multiple-carrier mode, the number of supportable uplink/downlink carriers, etc.

In step S330, the BS reports assigned carriers determined based on the multiple carrier capability to the MS. For example, if the carrier #1 301 is used as a primary carrier, the BS may report that the carrier #2 302 and the carrier #3 303 are the assigned carriers.

Data transmission and/or reception can be achieved between the BS and the MS by using the primary carrier. An additional carrier may be required according to a service request level.

In step S340, the BS activates the carrier #2 302 and the carrier #3 303. Activation information may be transmitted by being included in a carrier management message. The activation information may include a logical index of a carrier to be activated and an activation/inactivation indicator. When the carriers #2 302 and #3 303 are activated, these carriers are active carriers and are used as a secondary carrier. The MS does not have to perform initial ranging on the secondary carrier since network entry has already completed by using the primary carrier. The MS obtains an SFH (i.e., system information) by using each of the carrier #2 302 and the carrier #3 303 (steps S351 and S352), and attempts to perform periodic ranging (steps S361 and S362). If ranging on the secondary carrier is skipped, the MS may use timing, frequency offset, and power offset which are the same as those used for the primary carrier.

The BS may request the MS to perform periodic ranging and/or to receive SFH according to the deployment scenario and various factors.

In step S370, the MS can transmit activation confirmation information to the BS. The activation confirmation information is used to report the BS that data can be successfully transmitted or received by using activated secondary carriers (i.e., the carriers #2 and #3). Subsequently, data can be exchanged between the BS and the MS by using the activated secondary carriers (i.e., the carriers #2 and #3) (steps S381 and S382).

In step S390, the BS inactivates the carrier #3 303. The MS turns off the carrier #3 303. Then, the MS can exchange data with the BS by using the primary carrier and the secondary carrier (i.e., the carrier #2).

Figure 4:
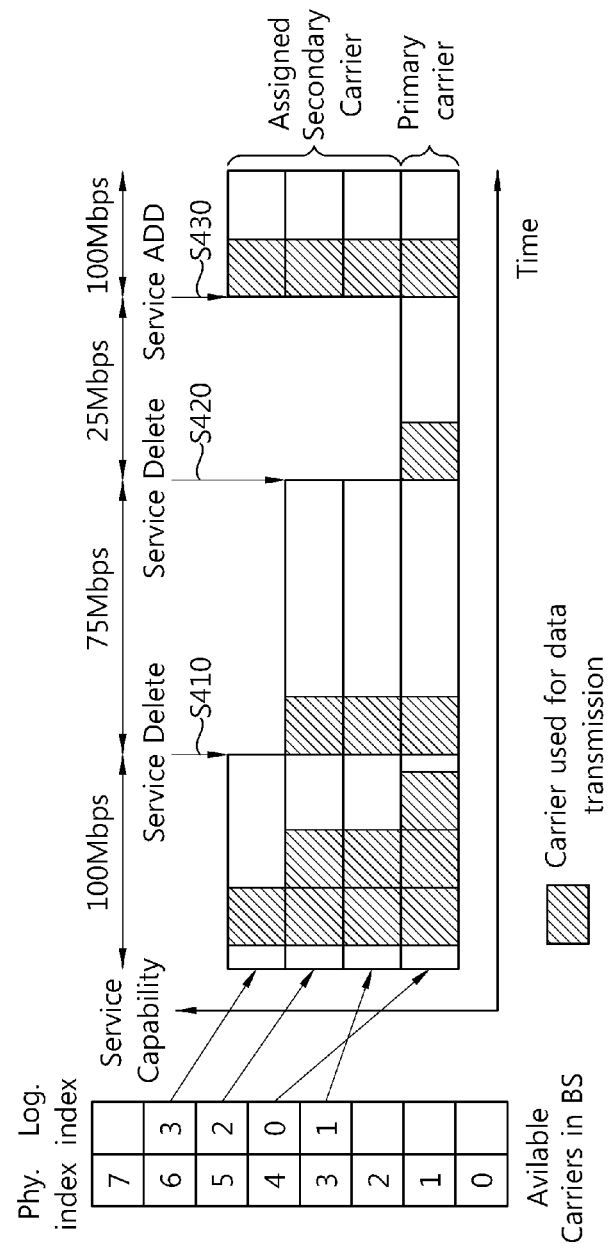
FIG. 4 shows an example of a multi-level carrier operation.

FIG. 4 shows an example of a multi-level carrier operation. Assume that there are 8 available carriers which are indexed with physical indices 0 to 7. An MS uses a carrier having a physical index of 4 as a primary carrier. A logical index of the primary carrier may be fixed to 0. A BS assigns carriers having physical indices of 3, 5, and 6 for assigned carriers. Logical indices of the assigned carriers are 1, 2, and 3 in an ascending order. The assigned carriers may be activated or inactivated according to a QoS requirement or a load condition.

Assume that all of the three assigned carriers are initially activated as secondary carriers and thus a service of up to 100 mega bits per second (Mbps) is guaranteed. The BS and/or the MS may use the primary carrier and an arbitrary number of carriers selected from the three carriers.

If one service is deleted and thus a service is guaranteed up to 75 Mbps, the BS may inactivate one carrier (i.e., a carrier having a logical index of 3) (step S410).

If one service is further deleted and thus it is enough to guarantee a service of 25 Mbps, the remaining secondary carriers (i.e., carriers having logical indices of 2 and 1) are inactivated (step S420).

If a service of large capacity is added and thus a service of 100 Mbps has to be guaranteed, all of the three assigned carriers are activated (step S430).

A signaling overhead for activation can be reduced for activation of the assigned carriers selected from the available carriers. For example, 3 bits are required to indicate indices of the total of 8 available carriers, whereas 2 bits are sufficient to indicate indices of four assigned carriers.

The available carriers are indicated by using a physical index unique in the BS. The assigned carriers are indicated by using a logical index unique in the MS. Therefore, active carriers can be indicated by simple indexing, and a size of a message for activation can be decreased.

There is no need for the MS to have carrier information or to attempt to perform detection on the remaining carriers which are not designated as the assigned carriers selected from the available carriers. Accordingly, power consumption and memory capacity of the MS can be reduced.

FIG. 5 is a block diagram of a wireless communication system according to an embodiment of the present invention. An MS 910 includes a processor 912, a display unit 913, and an RF unit 915. The processor 912 receives multiple carrier information, and exchanges multiple carrier capability with a BS 930. The processor 912 transmits and receives data by using a carrier which is activated by receiving activation information regarding at least one carrier selected from assigned carriers. In the aforementioned embodiments of FIG. 3 and FIG. 4, an operation of the MS can be implemented by the processor 912. The display unit 913 is coupled to the processor 912 and displays a variety of information to a user. The display unit 193 may use well-known elements such as a liquid crystal display (LCD), an organic light emitting diode (OLED), etc. The RF unit 915 is coupled to the processor 912, and transmits and receives a radio signal.

The BS 930 includes a processor 932 and an RF unit 935. The RF unit 935 transmits and receives a radio signal. The processor 932 broadcasts multiple carrier information, and selects assigned carriers to be assigned to each MS from available carriers. The assigned carriers can be selected based on multiple carrier capability received from the MS. The processor 932 can activate/inactivate at least one carrier selected from the assigned carriers on the basis of a QoS requirement or a load condition.

The processors 912, 932 may include application-specific integrated circuit (ASIC), other chipset, logic circuit and/or data processing device. The RF units 915, 935 may include baseband circuitry to process radio frequency signals. When the embodiments are implemented in software, the techniques described herein can be implemented with modules (e.g., procedures, functions, and so on) that perform the functions described herein. The modules can be executed by processors 912, 932.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for communication using multiple carriers in a wireless communication system, the method performed by a mobile station and comprising:
   receiving, by the mobile station, a first message from a base station, the first message including multiple carrier information regarding available carriers;
   transmitting, by the mobile station, multiple carrier capability to the base station;
   receiving, by the mobile station, a second message from the base station, the second message including information regarding at least one assigned carrier selected from the available carriers based on the multiple carrier capability;
   receiving, from the base station, a third message including information indicating activation or deactivation of the selected at least one assigned carrier;
   activating or deactivating, by the mobile station, the selected at least one assigned carrier according to the third message; and
   transmitting or receiving, by the mobile station, data by using the activated at least one assigned carrier when the at least one assigned carrier is activated.

2. The method of claim 1, wherein the first message is received via a primary carrier.

3. The method of claim 2, wherein the third message is received via the primary carrier.

4. The method of claim 1, wherein:
   the available carriers are referenced by a physical index unique to the base station; and
   the activation or deactivation of the at least one assigned carrier is referenced by a logical index unique to the mobile station.

5. The method of claim 1, wherein the activation or deactivation of the selected at least one assigned carrier is determined based on a quality of service (QoS) requirement or a load condition of the base station.

6. The method of claim 1, wherein the first message, the second message and the third message are received via a primary carrier that is a carrier via which the mobile station completes initial network entry.

7. The method of claim 1, wherein the multiple carrier information includes a number of the available carriers and physical carrier indexes for the number of the available carriers.

8. The method of claim 1, wherein the third message further includes information indicating whether periodic ranging is required for the activated at least one assigned carrier.

9. The method of claim 1, further comprising:
transmitting, by the mobile station, a confirmation message to the base station in order to confirm the activation of the selected at least one assigned carrier.

10. A method for communication using multiple carriers in a wireless communication system, the method performed by a base station and comprising:
transmitting, by a base station, a first message to a mobile station, the first message including multiple carrier information regarding available carriers;
transmitting, by the base station, a second message to the mobile station, the second message including information regarding at least one assigned carrier selected from the available carriers;
determining, by the base station, whether to activate or deactivate the selected at least one carrier; and
transmitting, by the base station, a third message to the mobile station, the third message including information indicating activation or deactivation of the selected at least one assigned carrier.

11. The method of claim 10, wherein:
the available carriers are referenced by a physical index that is unique to the base station; and
the activation or deactivation of the selected at least one assigned carrier is referenced by a logical index that is unique to the mobile station.

12. The method of claim 11, wherein the activation or deactivation of the selected at least one assigned carrier is determined based on a quality of service (QoS) requirement or a load condition of the base station.

13. The method of claim 11, further comprising receiving, by the base station, multiple carrier capability from the mobile station, wherein the selection of the at least one assigned carrier is based on the multiple carrier capability.

14. A mobile station comprising:
a radio frequency (RF) unit configured to transmit and receive radio signals; and
a processor operatively coupled to the RF unit and configured to:
receive a first message from a base station, the first message including multiple carrier information regarding available carriers;
transmit multiple carrier capability to the base station;
receive a second message from the base station, the second message including information regarding at least one assigned carrier selected from the available carriers based on the multiple carrier capability;
receive a third message from the base station, the third message including information indicating activation or deactivation of the at least one assigned carrier;
activate or deactivate the selected at least one assigned carrier according to the third message; and
transmit or receive data by using the activated at least one assigned carrier when the at least one assigned carrier is activated.

15. The mobile station of claim 14, wherein the first message is received via a primary carrier.

16. The mobile station of claim 15, wherein the third message is received via the primary carrier.

17. The mobile station of claim 14, wherein:
the available carriers are referenced by a physical index that is unique to the base station; and
the activation or deactivation of the selected at least one assigned carrier is referenced by a logical index that is unique to the mobile station.

* * * * *